Nov. 15, 1932.  G. W. HYSER  1,887,644
CONTROL PANEL
Filed Dec. 17, 1928    4 Sheets-Sheet 1
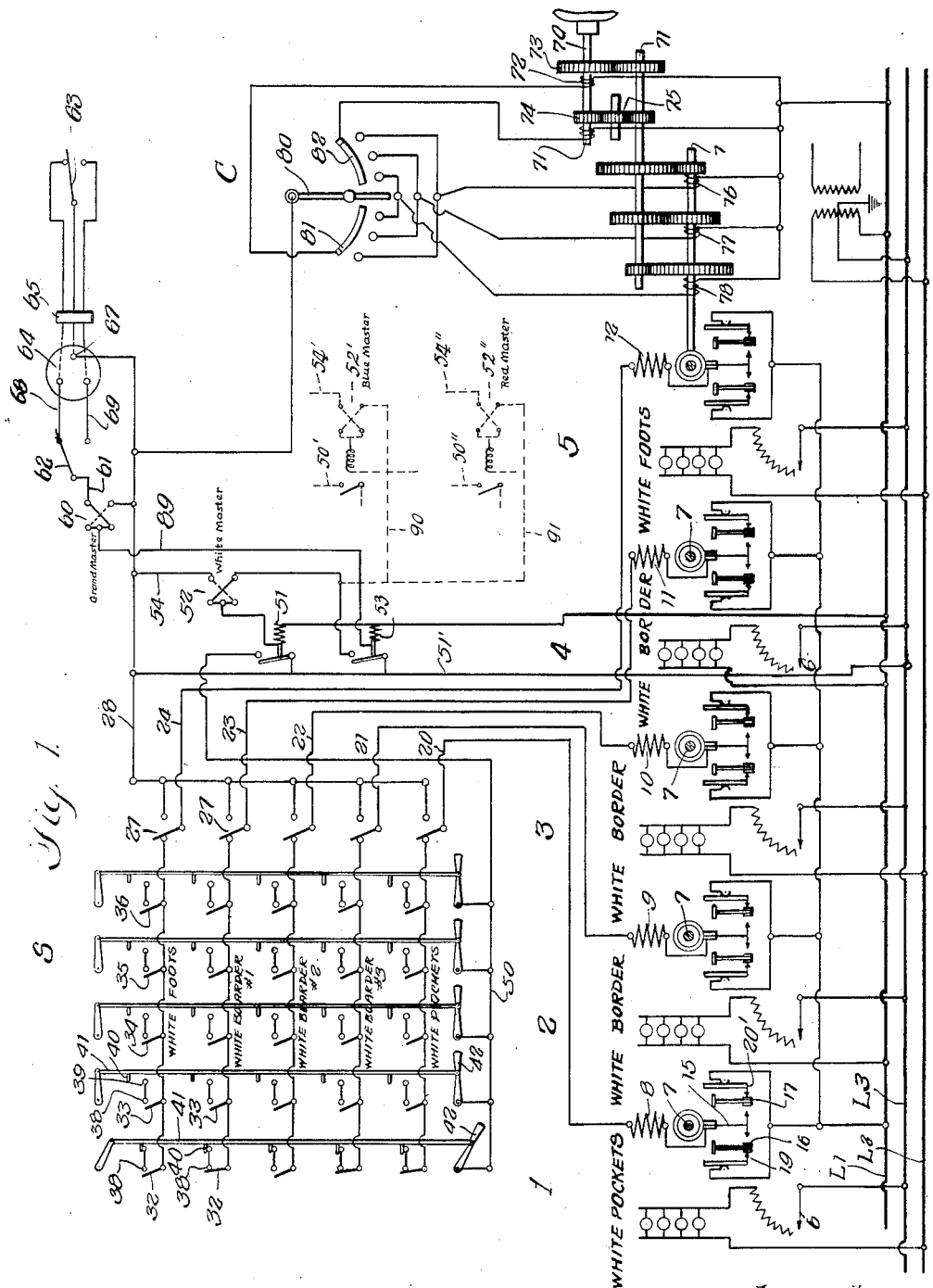

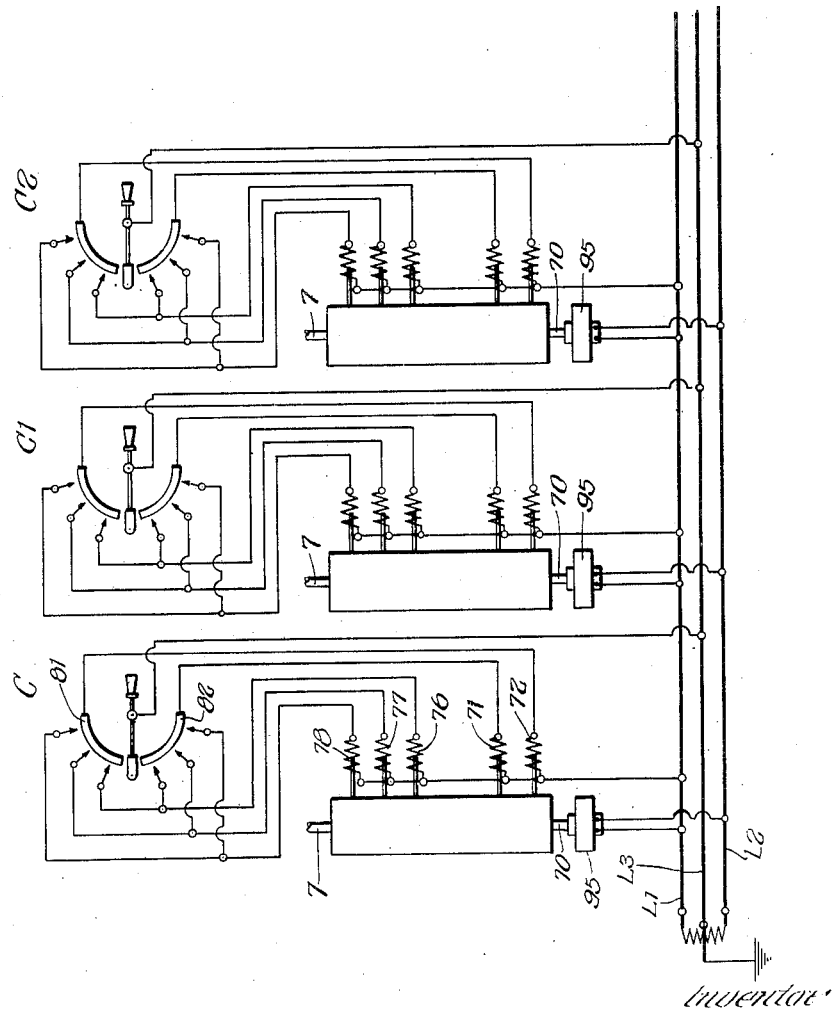

Nov. 15, 1932.   G. W. HYSER   1,887,644
CONTROL PANEL
Filed Dec. 17, 1928   4 Sheets-Sheet 3
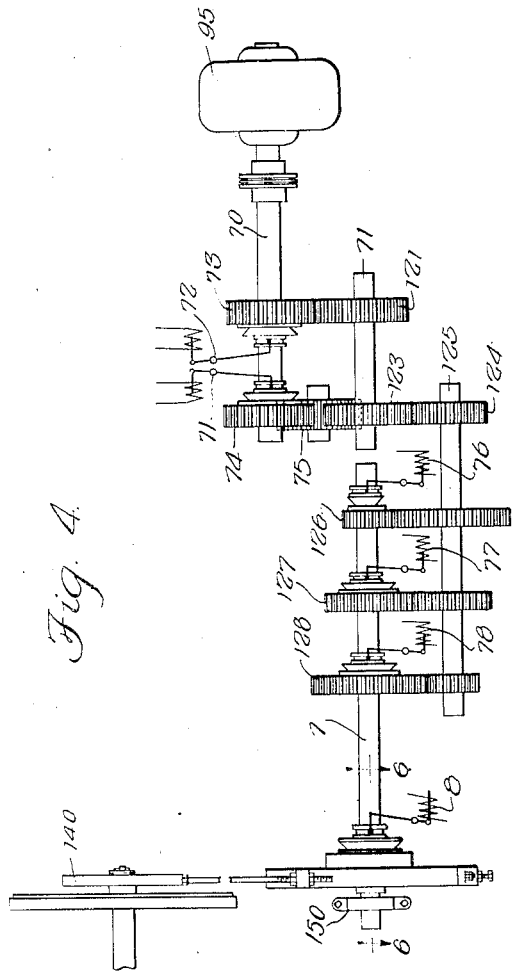
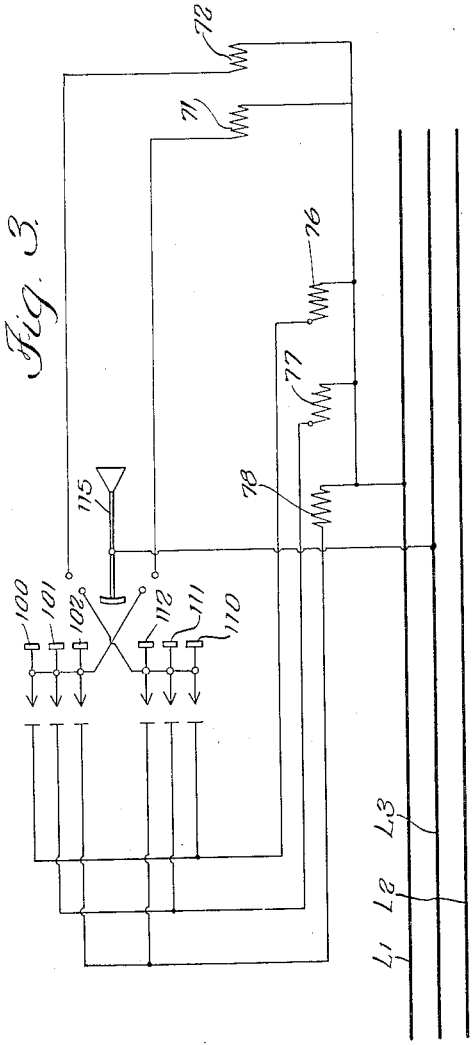

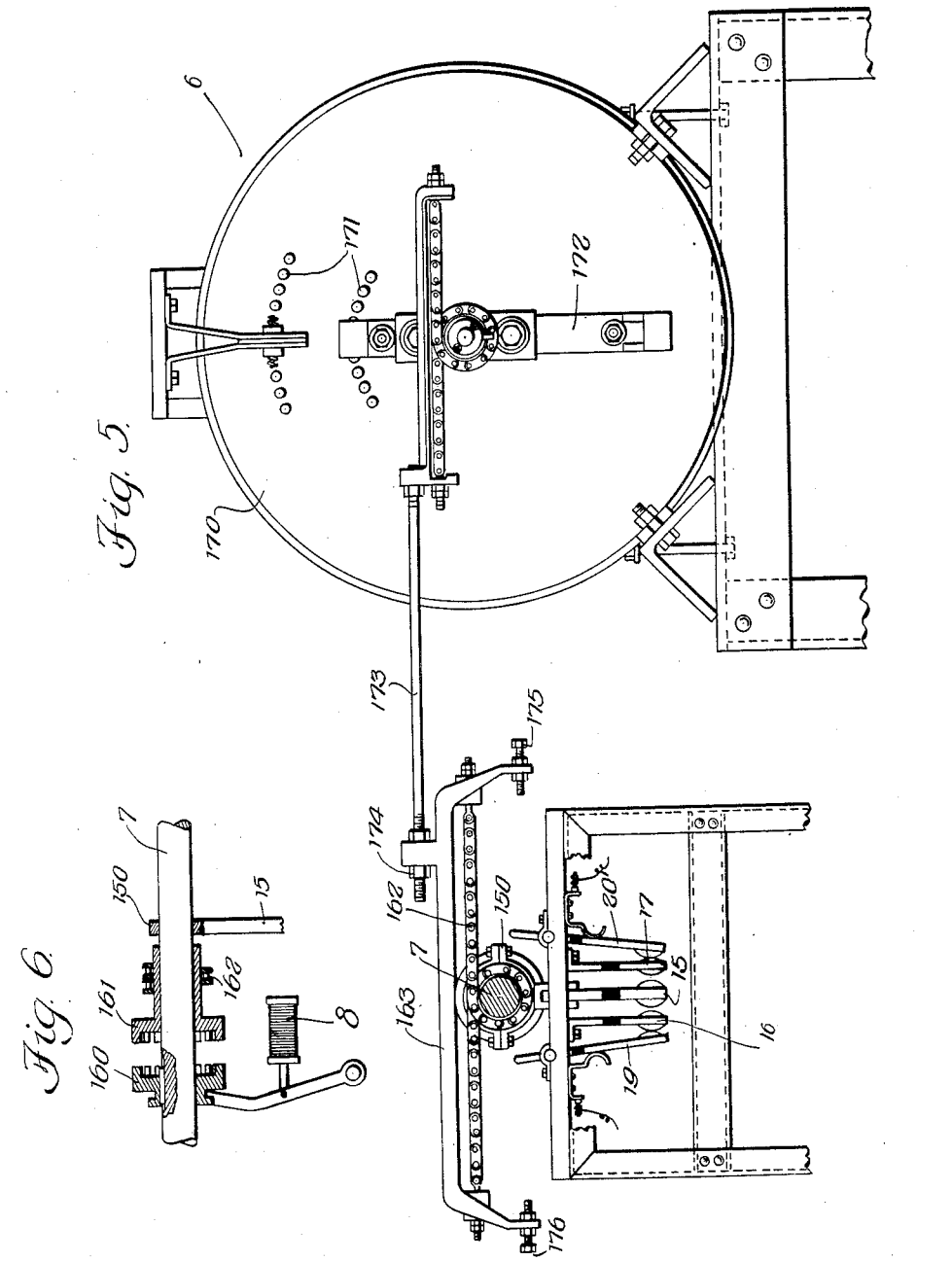

Patented Nov. 15, 1932

1,887,644

UNITED STATES PATENT OFFICE

GEORGE W. HYSER, OF MINNEAPOLIS, MINNESOTA

CONTROL PANEL

Application filed December 17, 1928. Serial No. 326,427.

This invention relates to electrical control systems, and more particularly to such systems as are adapted for use to control the lighting in theatres, auditoriums, or other places where numerous lights are used for obtaining different lighting effects.

An object of the present invention is to provide an improved control system wherein the "set up" for a number of different scenes or effects may be preselected, and any of the preselected "set ups" or effects may be readily produced by a simple manipulation on the part of the operator. It is a particular object of this invention to provide a system wherein the preselected effects are produced by automatically manipulating the dimmers that are provided in the various lighting circuits, the preselection being as to the dimmers to be manipulated.

It is a further object of the present invention to provide a system of the above type wherein the dimmers may be operated in either direction at any one of a number of different speeds, the speed of operation being preferably preselected.

It is a still further object of the present invention to provide a control system wherein all the lights of the same group may be brightened or dimmed at the desired rate without regard to the rate of change or to the direction of change of the intensity of illumination of the lights of the different groups.

The present invention further contemplates the provision of a novel friction transfer switch and limit switch assembly associated with each dimmer and operated therewith for preventing the further operation of the dimmer when the same has reached its limit of travel in either direction while permitting the operation in the reverse direction. While the present improved control system is shown as embodied in a control system of the kind shown in my prior Patent, No. 1,670,856, of May 22, 1928, it is to be understood that the present improvements are not limited to such a control system and may be embodied in other control systems as desired.

The attainment of the above and further objects of the present invention will be apparent from the following specification taken in conjunction with the accompanying drawings forming a part thereof.

In the drawings:

Fig. 1 is a diagrammatic view of the lamp circuits and mechanism for controlling them, the lamps of only one color being shown.

Fig. 2 is a diagrammatic view of the circuits for controlling the direction and speed of operation of the dimmer operating shafts for the various light banks;

Fig. 3 is a modified form of the circuit shown in Fig. 2;

Fig. 4 is a diagrammatic view showing the driving connections between the driving motor and one of the driven dimmers;

Fig. 5 is an end view of a friction transfer switch and the limit switches associated with each of the dimmers; and Fig. 6 is a fragmentary view taken along the line 6—6 of Fig. 4.

Reference may now be had more particularly to Fig. 1, showing in a diagrammatic form the circuits for controlling all of the lights of one particular color, white for instance. It is to be understood that a similar arrangement is provided for controlling the red lights, by way of example, and another such circuit is provided for the blue lights, etc. Fig. 1 shows in addition a grand master switch and a remote control switch for controlling all of the colored lights from one point. The banks of lamps indicated at 1, 2, 3, 4 and 5 have been indicated as "White pockets", "White border 3", "White border 2", "White border 1", and "White foots", respectively. The lamps at 1, as well as the other banks of lamps, are connected to the main power lines L1 and L2 through dimmers such as 6. The dimmer handle controls the connection of the lamp bank 1 to the power lines. The shaft 7 is freely rotatable with respect to the dimmer 6, a clutch 8 being provided for establishing an operating connection between the dimmer 6 and the shaft 7. Upon the energization of the clutch, the dimmer arm 6 is rotated in one direction or the other to gradually turn the lights 1 on or off. Similar clutches 9, 10, 11 and 12 are provided for controlling the lamp banks 2, 3, 4 and 5, respectively. The power lines include the two live lines L1 and L2 and the grounded neutral L3. One end of the clutch coil 8 is connected to a contact 15 of a construction to be more fully explained hereinafter.

The contact 15 is mounted upon the rotatable shaft 7 and is freely rotatable with respect to the shaft except for a small amount of friction. Upon rotation of the shaft 7 in either direction, the contact arm 15 swings a short distance in a clockwise or counter clockwise direction, depending upon the direction of rotation of the shaft 7. The contact 15 thus engages the contact 16 or the contact 17. At this time the switch arm 15 engages a stationary stop which limits its motion. The frictional engagement of the contact with the rotating shaft is sufficient to maintain the contact in the position to which it was moved upon the initial rotation of the shaft. The contact 16 is connected through an upper limit switch 19 to the line L1, and the contact 17 is connected through a down limit switch 20' to the same line L1. When the shaft 7 rotates in a direction to operate the dimmers to increase the illumination, the contact 15 is swung into engagement with the contact 16 whereas when the shaft rotates to operate the dimmers in the reverse direction, the contact 15 is swung into engagement with the contact 17. Thus when the shaft 7 is rotating, the clutch coil 8 is always connected to the line L1 through one or the other of the two limit switches. If the limit switch through which the coil 8 happens to be connected is open, then it is apparent that the coil 8 cannot be energized until the shaft is rotated in the opposite direction, thus connecting the coil 8 to the line L1 through the other limit switch. The clutch coils are connected through the conductors 20, 21, 22, 23 and 24 to the switches 27. When the switches 27 are swung to the right, the conductors 20 to 24 are connected to the neutral line L3 by way of the conductor 28, whereas when those switches are operated to the left, as indicated in the drawings, the conductors 20 to 24 are connected to the preselecting switch board S.

The preselecting switch board S is mechanically and electrically of the same construction as is the switch board shown in my patent above referred to, and reference may be had to that patent for a more complete description of the switch board. It is sufficient to state that the switch board consists of a number of switches including switch blades 32, 33, 34, 35 and 36. Each of the last mentioned blades may be swung into and out of engagement with a stationary contact 38 which is in electrical connection with a stationary contact 39. A number of movable contacts 40 mounted upon the vertical conducting members 41 may be moved into and out of engagement with the contacts 39 by moving the respective rods 41. For this purpose, the handles 42 are provided.

Each vertical row of switches is provided with one contact bar or rod such as 41, and by operating one of the handles 42 all of the contacts 40 associated with the particular rod 41 operated are brought into or out of engagement with the contacts 39 that are connected to the contacts of the vertical row of switches. The switch blades in the vertical rows are connected through the switches 27 to the respective clutch coils.

The conductor 50 is electrically connected to all of the vertical rods 41 and by means of the electromagnetic switch 51 the conductor 50 may be connected to the conductor 51' which is connected to the grounded neutral line L3. One side of the electromagnetic switch 51 is connected to the line L1, and the other side of the winding of the switch is connected to the two-way switch 52. The switch 52 is the "white master" switch and when that switch is in the position shown in full lines, the coil 51 is controlled through the electromagnetic switch 53. When the white master switch is in the position shown in dotted lines, the coil 51 is connected through the conductor 54 to the grounded neutral conductor 51'. This causes a direct energization of the switch 51, thereby connecting the conductor 50 to the grounded neutral line. When the switch 52 is in the full line position, the control of the switch 51 is exercised by the switch 53 which may be energized through the grand master switch 60. When the grand master switch 60 is in the dotted line position, the coil 53 is energized, its circuit extending from the line L1, through the coil 53, thence to the switch 60 and to the conductors 28 and 51' to the grounded neutral line. When the grand master switch is in the position shown in full lines in Fig. 1, the control is relayed to the switches 62 and 63.

The switches 62 and 63 are electrically connected by means of a removable plug and socket 64—65, the plug 65 being connected to the switch 63 by means of a three conductor cable. The neutral wire 28 extends to a point 67 in the socket 64 and, when the plug is inserted into the socket the neutral wire is extended to the switch blade. The switch blade 63 is always in either the upper or the lower position, hence the neutral conductor is always extended to either the conductor 68 or the conductor 69. Thus the switches 62 and 63 constitute an ordinary two-way control circuit whereby the circuit from the neutral conductor 28 may be extended to the conductor 61 or disconnected from said conductor 61 at either the switch point 62 or at the switch point 63, each switch having complete control independent of the other switch. Thus when the grand master switch 60 is thrown to the full line position the control of the relay 53 is transferred to the switches 62 and 63. When the grand master switch 60 is in the dotted line position, the switches 62 and 63 have no control over the relay 53.

A motor rotates the shaft 7 at any one of three different speeds and in either direction. The shaft 70 may be coupled to the shaft 71 by means of the clutch 72 which clutches the gear 73 to the shaft 70 or, the shaft 71 may be driven from the shaft 70 by the gear 74 which is clutched to the shaft 70 by means of the clutch 71.

An idler 75 is provided so that the gears 73 and 74 drive the shaft 71 in opposite directions. The shaft 71 drives the gears that are freely rotatable upon the shaft 7, any one of the gears upon the shaft 7 being clutchable to the shaft by means of the magnetic clutch coils 76, 77 and 78, respectively. A controller C is provided for controlling the energization of the direction clutches 71 and 72 and of the speed clutches 76, 77 and 78. One side of the lever 80 of the controller is connected to the grounded neutral wire 28 and thereby the lever 80 connects the segments 81 or 82 with the grounded conductor and likewise the lever 80 connects the grounded conductor to any one of the three clutches 76, 77 and 78. The operation of the system herein disclosed is as follows: The switches 32 in the first vertical row of switches on the switch board S are operated to prepare circuits for the desired ones of the clutch coils 8 to 12 to produce a desired lighting effect, which may be termed scene 1. Likewise, the switches 33 in the second vertical row are operated to prepare circuits for the same clutch coils 8 to 12 to produce a different desired lighting effect, which lighting effect may be termed scene 2. In a similar manner, the switches in the third, fourth and fifth vertical rows are operated to condition the circuits of the clutch coils for scenes 3, 4 and 5, respectively.

If it is desired to control the lighting effects through the white master 52, that switch is operated to the dotted line position, thus establishing a circuit for the relay 51, whereas if it is desired to control the lighting effects through the grand master 60, then the switch 52 is operated to the position shown in full lines and the grand master 60 is operated to the position shown in dotted lines. When the grand master is operated to the dotted line position a circuit is established by it for the relay 53 which relay upon operating establishes a circuit for the relay 51, said last mentioned circuit extending from the grounded line L3 through the conductor 51' and front contact on the relay 53, through the switch 52 which is now in the position shown in full lines in the figure, thence by way of the operating coil of relay 51 to the line L1. The operation of the relay 51 extends the grounded neutral conductor through the front contact of the relay to the conductor 50. Previous to the operation of the grand master switch 60, one of the operating handles 42 was operated to bring all of the contacts 40 upon the associated operating rod 41 into engagement with the contacts 39. A circuit is thereby established, upon the grounding of the conductor 50 through the grand master switch, as heretofore set forth, which circuit extends through the operating rod 41, through the particular switches such as 32 that have been closed, to the clutch coils, such as 8 to 12. From there the circuit extends through the direction switch such as 15 and one or the other of the limit switches 17 and 19 to the line L1. Thus if the limit switch through which the circuit extends is closed, the clutch coil is energized and clutches the associated dimmer to the rotating shaft 7. This operates the dimmer arm to establish a circuit for the bank of lights connected therewith. The dimmer arm continues to operate until it reaches its limit of travel whereupon the limit switch is opened thus opening the circuit for the clutch coil. It now becomes impossible to energize the clutch coil until the shaft 7 is rotated in the opposite direction, at which time the direction switch 15 will shift into engagement with the other limit switch which is now closed and permits the establishment of a circuit to the clutch thereby permitting the rotation of the dimmer in the opposite direction.

When it is desired to produce the illumination preselected for scene 2, for instance, the second lever 42 is operated with the first lever 42 in its initial position. This establishes circuits for the clutch coils 8 to 12 as determined by the particular setting of the switches 33 in the second vertical row of switches.

The conductors 90 and 91 extend to the circuits for other groups of lights, for instance the blue lights and the red lights, respectively, and each controls a relay such as the relay 51 over a circuit similar to the circuit over which the relay 51 is controlled. A blue master switch 52', and a red master switch 52'' is provided for controlling those relays and those relays control the establishment of a circuit to the conductors 50' and 50'' for controlling circuits similar to the circuits controlled by the conductor 50. The conductors 50' and 50'' control the blue and the red lights respectively. Each group of lights has its individual relay 51 and master switch 52, whereas the grand master switch 60 and the grand master relay 53 are common to all of the groups of lights.

Reference may now be had to Fig. 2 showing the circuit for controlling the clutches 71, 72, 76, 77 and 78 of the shafts to which the different colored dimmers are connected. The controller C controls the group of white lights, the controller C1 the group of red lights, and the controller C2 the group of blue lights. The circuits for each of the controllers is the same as that shown in Fig. 1. The motors 95 are connected to the power lines L1 and L2 and drive the shaft 70.

While I have herein shown all the white lights arranged in one group, all the red lights in another, and so forth, it is of course understood that the group of white lights or any other group of lights may be split up into two or more groups or sections if desired.

Reference may now be had to Fig. 3 showing a modified form of controller circuit for controlling the direction and speed of operation of the shaft 7 of Fig. 1. In this circuit the push button switches 100 and 102 control the clutches 76, 77, and 78 for one direction of operation of the shaft, and the push buttons 112, 111 and 110 control the same clutches for the opposite direction of rotation. The clutches 71 and 72 are connected to be actuated upon opposite rotation of the controller 115.

To energize the clutch coil 78, for instance, and to drive the shaft in a direction such as determined by the clutch 71, the push button 102 is depressed and the lever 115 is rotated in a counter clockwise direction.

During this operation the desired one of the push buttons 112, 111 or 110 may be depressed preparatory to the return movement of the operating shaft. When it is desired to institute the return motion at the preselected speed, the lever 115 need merely be swung in the opposite direction and the desired circuit changes are made. The upper three push buttons are mechanically interlocked so as to permit the operation of but one button at a time and the lower three push buttons are likewise interlocked.

Reference may now be had to Fig. 4 showing in diagrammatic form the layout of the operating shaft. The motor 95 drives the shaft 70, which shaft has two gears loosely mounted thereon. The electromagnetically controlled clutches 71 and 72 are adapted to clutch either of the gears to the shaft 70. The gear 73 drives the shaft 71 through a gear 121 which is keyed to the shaft 71 whereas the gear 74 drives the shaft 71 through an idler gear 75 and a gear 123 which is mounted on the shaft 71. The gears 73 and 74 thus rotate the shaft 71 in opposite directions. The gear 123 is in mesh with a gear 124 mounted on the shaft 125 and thereby drives that shaft. The shaft 7 has a number of gears 126, 127 and 128 loosely mounted thereon which gears may be clutched to the shaft 7 by means of the clutches 76, 77 and 78. Thus the shaft 7 may be driven at any one of three speeds from the shaft 125. The clutch coil 8 controls the operation of the dimmer 140 from the shaft 6 in a manner shown more particularly in Figs. 5 and 6.

The shaft 7 also has the clutches 9, 10, 11 and 12 mounted thereon. While the embodiments of the invention thus far described contemplate the employment of separate motors for driving the shafts that control the dimmers of the various colored lights, it is understood that a single motor such as 95 of Fig. 4 may be used. In this case the shaft 70 is provided with two more sets of direction clutches such as the clutches 71 and 72, one set of direction clutches being used for driving a member such as the member 71 that controls the blue lights and the other set of direction clutches driving a member such as the member 71 controlling the red lights.

Reference may now be had to Figs. 5 and 6 showing the friction transfer switch and the limit switches and also showing the manner of operating the dimmers. The friction transfer switch 15 is mounted upon the shaft 7 by means of two split clamps 150. The clamps embrace the shaft 7 and ordinarily would tend to rotate with the shaft but if held against rotation by even a slight force, the shaft 7 slips within the split clamps, the frictional losses being small since the clamps 150 do not tightly engage the shaft 7. When the shaft 7 rotates in a counter clockwise direction the contact arm 15 is moved into engagement with the stationary contact 17 where it remains until the direction of rotation of the shaft is reversed whereupon the switch 15 is moved into engagement with the stationary contact 16. The movable up and down limit switches 19 and 20' are normally in electric engagement with the contacts 16 and 17 respectively.

This is entirely independent of the engagement of the clutch 8 since the split clamp 150 is mounted upon the shaft 7 outside of the clutch. When the clutch is energized the member 160 which is keyed to the shaft 7 is moved into engagement with the member 161 which is freely rotatable about the shaft 7. This keys the member 161 to the shaft 7 causing it to rotate therewith. The member 161 has a chain 162 wound around it and secured thereto at one point by means of a pin. The chain 162 is secured to the carriage 163 so that upon rotation of the member 161 the carriage 163 is moved either to the right or to the left depending upon the direction of rotation. When the carriage reaches its limit of motion in either direction it opens one or the other of the two limit switches, thus opening the circuit for the clutch coil 8 in the manner previously described and stopping the further rotation of the member 161.

The dimmer plate 170 is of a standard construction and consists of a number of contacts 171 wiped over by a contact arm 172, said contacts being connected to a suitable resistance element embedded within the dimmer plate. The dimmer arm 172 is rotated in the usual manner when the operating rod 173 is reciprocated. The rod 173 is connected to the carriage 163 so that reciprocation of the carriage will cause a like movement of the operating rod 173.

Adjusting nuts 174 are provided for adjusting the position of the dimmer arm 176 with respect to the carriage 163. The bolts 175 and 176 that actuate the limit switches upon the movement of the carriage to its extreme position in either direction are adjustable to a slight extent thereby affording an adjustment of the degree of movement imparted to the operating member 173.

It is to be noted that in the embodiment of the invention herein shown all the white light dimmers that are to be operated are operated at the same speed and in the same direction. The same is true of the dimmers for the red lights and for the blue lights. If desired, individual drives or individual direction controls may be provided for each of the dimmers so that any dimmer might be operated to increase the illumination of its bank of lamps while other dimmers are operated to decrease the illumination of other banks of lamps of the same color.

In compliance with the requirements of the patent statutes I have herein shown and described a preferred embodiment of my invention. It is, however, to be understood that the invention is not limited to the precise construction shown, the same being merely illustrative of the invention.

What I consider new and desire to secure by Letters Patent is:

1. In a lighting system, a plurality of lights, dimmers for controlling the intensity of illumination of the lights, a common operating shaft and individual electromagnetic clutch means for controlling the establishment of a driving connection from the shaft to the respective dimmers, means for preselecting a number of groups of dimmers for individual group operation, all of the dimmers being selectable for each of the groups, means for causing the electromagnetic means to simultaneously establish a driving connection to all the dimmers of any desired one of the preselected groups of dimmers, and means for controlling the rate of operation of the shaft.

2. In a lighting system, a plurality of lights, dimmers for controlling the intensity of illumination of the lights, electromagnetic means for controlling the dimmers, means for preselecting a number of groups of dimmers for individual group operation, all of the dimmers being selectable for each of the groups, means for causing the electromagnetic means to simultaneously operate all of the dimmers of any desired one of the preselected groups of dimmers, and switching means manually operable while the dimmers are being operated in either direction for preselecting the condition of reverse operation of the dimmers.

3. In a lighting system, a plurality of lights, dimmers for controlling the intensity of illumination of the lights, a common operating shaft and individual electromagnetic clutch means for controlling the establishment of a driving connection upon the shaft to the respective dimmers, means for preselecting a number of groups of dimmers for individual group operation, all of the dimmers being selectable for each of the groups, and means for causing the electromagnetic means to simultaneously establish a driving connection to all the dimmers of any desired one of the preselected groups of dimmers.

4. In an electric lighting system, a plurality of different dimmers each controlling a lighting circuit, electrically controlled means for operating the respective dimmers, a preselecting switch board, and switching means for selectively connecting the electrically controlled means to the switch board or to a source of potential at will.

5. In a lighting system, a plurality of groups of dimmers, control means for each of the groups, a master control for all of said control means, each group of control means including means for preselecting a plurality of subgroups of dimmers for operation, all of the dimmers in each group being available for each subcombination in that group, means for connecting all the dimmers of any preselected subgroup to the master control, and means associated with the control means of each group for controlling the rate of operation of the dimmers of the subgroups of that group.

6. In a lighting system, a plurality of dimmers, electromagnetic means for operating the respective dimmers, switching means for preselecting a plurality of combinations of said means for alternate operation, all of the electromagnetic means being available for each of the combinations, means for selectively energizing the electromagnetic means in any of the preselected combinations, and limit switches for limiting the extent of operation of the respective dimmers.

7. In a lighting system, different groups of lights, separate dimming means for controlling lights of the respective groups, controllers for controlling the dimmers of the respective groups of lights, all the dimmers of the same group being controlled by the same controller, each controller including means for varying the direction and the speed of operation of the dimmers controlled thereby, electrically controlled means for placing the dimmers under the control of their respective controllers, and means for preconditioning the circuit of the last named means for a plurality of subsequent operations.

8. In a lighting system, a plurality of dimmers, a common shaft for operating the dimmers, clutches between the dimmers and the shaft for operatively connecting any of the dimmers to the shaft, means for driving the shaft in either direction at any one of a plurality of different speeds, electromagnetic means for operating the respective clutches, and switching means for preselecting a plurality of combinations of clutches for subsequent separate operation all of the clutches being available for each of the combinations.

9. In combination, a dimmer, an operating shaft, means including a clutch for releasably connecting the dimmer to the shaft whereby the shaft operates the dimmer, limit switches for disengaging the clutch when the dimmer reaches its limit of travel in either direction, and means controlled in accordance with the direction of operation of the shaft and the condition of the limit switches for controlling the actuation of the clutch.

10. In a lighting system, an operating shaft, means for operating the shaft at variable speeds, a controller for controlling the rate and the direction of operation of the shaft, a plurality of dimmers, clutches for releasably clutching the dimmers to the shaft for operating the dimmers, and limit the direction switches for controlling the operation of the clutches.

11. In combination, an operating shaft, a switch frictionally held on said shaft and operated in either of two directions depending upon the direction of operation of the shaft, an electromagnetic clutch controlled by said switch, and limit switches cooperating with said switch for controlling the clutch.

12. In a dimmer control system, a plurality of dimmers, means for preconditioning the dimmers for operating at any one of a plurality of different speeds in one direction, means for preconditioning the dimmers for operation at any one of a plurality of different speeds in the opposite direction, and a two way switch for rendering either of the preconditioning means effective.

13. In a dimmer control system, a group of dimmers, means for preselecting a plurality of sub-groups of dimmers from the group for subsequent operation, all of the dimmers being available for each sub-group, common operating means for operating all of the dimmers of any of the preselected sub-groups at any one of a plurality of speeds in either direction, said last named means being effective to instantly change the speed or the direction of operation of the dimmers at any point during the operation of the dimmers, a single switch associated with each preselected sub-group for placing its sub-group under the action of the common operating means, said first named means including means for stopping any of the dimmers at any point of operation thereof, and means for starting any of the dimmers during the operation of the other dimmers.

14. In a dimmer control system, a group of dimmers, means for preselecting a plurality of sub-groups of dimmers from the group for subsequent operation, all of the dimmers being available for each sub-group, means for operating the dimmers of any of the preselected sub-groups at will and at any one of a plurality of speeds in either direction, said first means including means for starting any other group of dimmers at any point during the operation of the first started group, whereby the second group of dimmers is caused to follow up the first group, and means for stopping each dimmer upon its reaching its limit of travel.

15. An electric lighting system including a plurality of groups of lights, movable dimmers for controlling the lights, a preselecting switchboard for preselecting a plurality of combinations of dimmers for future operation, all of the dimmers being available for each of the combinations, and means for selectively operating the dimmers of any of the preselected combinations of dimmers, said switchboard including switching means manually operable at will for adding to or subtracting from the number of dimmers in any combination during the operation of the dimmers of that combination.

16. An electric lighting system including a plurality of groups of lights, movable dimmers for controlling the lights, a preselecting switchboard for preselecting a plurality of combinations of dimmers for future operation, all of the dimmers being available for each of the combinations, means including an operating shaft common to all the dimmers for selectively operating the dimmers of any of the preselected combinations of dimmers, and switching means operable at will for altering the speed of operation of the shaft while the dimmers are operating.

17. An electric lighting system including a plurality of groups of lights, movable dimmers for controlling the lights, a preselecting switchboard for preselecting a plurality of combinations of dimmers for future operation, all of the dimmers being available for each of the combinations, means for selectively operating the dimmers of any of the preselected combinations of dimmers, said switchboard including means for adding to or subtracting from the number of dimmers in any combination during the operation of the dimmers of that combination, and manually operable switching means operable at will for changing the direction of operation of the dimmers at any point during their operation.

18. An electric lighting system including a plurality of groups of lights, movable dimmers for controlling the lights, a dimmer control shaft and electromagnetically controlled clutches for establishing a driving connection between any of the dimmers and the control shaft, a preselecting switchboard for preselecting a plurality of combinations of dimmers for future operation, all of the dimmers being available for each of the combinations, including a shaft and the clutches, means for selectively operating the dimmers of any of the preselected combinations of dimmers, and switching means operable at will for controlling the speed of operation and the direction of operation of the shaft at any point during the operation.

In witness whereof, I hereunto subscribe my name this 3rd day of December, 1928.

GEO. W. HYSER.

CERTIFICATE OF CORRECTION.

Patent No. 1,887,644.        November 15, 1932.

GEORGE W. HYSER.

It is hereby certified that error appears in the printed specification of the above numbered patent requiring correction as follows: Page 7, line 7, claim 18, strike out the word "means" and insert the same to follow "combinations," in line 6; and line 13, for "the" read "its"; and that the said Letters Patent should be read with these corrections therein that the same may conform to the record of the case in the Patent Office.

Signed and sealed this 17th day of January A. D. 1933.

(Seal)

M. J. Moore,

Acting Commissioner of Patents.